United States Patent Office 3,528,938
Patented Sept. 15, 1970

3,528,938
WATER DILUTABLE LACQUERS OF COPOLY-
MERS CONTAINING HYDROXYL AND CAR-
BOXYL GROUPS
Franz Scheckenbach, Hilden, Rhineland, and Hans Zoebe-
lein, Monheim, Rhineland, Germany, assignors to Hen-
kel & Cie, G.m.b.H., Dusseldorf, Germany, a corpora-
tion of Germany
No Drawing. Filed Mar. 17, 1967, Ser. No. 623,819
Claims priority, application Germany, Apr. 6, 1966,
H 59,037
Int. Cl. C08f 27/14, 15/40
U.S. Cl. 260—29.6                                  7 Claims

ABSTRACT OF THE DISCLOSURE

Water-dilutable lacquer solutions formed by partial hydrolysis of copolymers of acrylic acid esters and polymerizable monomers containing hydroxyl groups and preparation thereof.

PRIOR ART

Water-dilutable lacquer solutions are based on binding agents containing therein both active groups required for cross-linking during the baking to form the final coating in the same polymer molecule and therefore do not require any additional cross-linking agents and are very useful in electrophoretic coating processes. However, the number and type of ester groups remaining unchanged in the copolymers have a substantial influence on the quality of the lacquer films and this in turn is based on the condition that the reactive groups and the esters groups in the copolymer can be easily controlled. Also, in order to produce lacquer solutions free of turbidity and of unpleasant odors, it is necessary that unreacted monomeric starting materials and other undesired by-products be removable without difficulty.

Japanese Pat. No. 1540/64 discloses water dilutable lacquer solutions of copolymers of allyl alcohol, an α, β-unsaturated carboxylic acid and a vinyl monomer in the form of their salts. To prepare the said lacquers, the monomers, such as allyl alcohol, acrylic acid and an acrylic acid ester, are copolymerized and then neutralized after the elimination of any unreacted monomers. However, the purification of the copolymers produced by this process causes considerable difficulties and can be accomplished only with structural modifications which are most apparent in diminished storeability and reduced reactivity. When a careful purification is effected with the usual technical methods, wherein any cross-linking of the copolymer is avoided to the greatest possible extent, no sufficiently pure material can be obtained. Small residues of monomeric acrylic acid or methacrylic acid esters, particularly ing and stinging odor, and residues of unreacted monomeric acrylic acid or methacrylic acid esters, particularly esters of high-molecular weight alcohols, lead to undesirable turbidities in the aqueous lacquer solutions. Even allowing for a certain amount of impurity of monomers and solvents, a purification of such particularly reactive copolymers is out of the question, since the thermal and mechanical requirements necessary for the purification will lead to cross-linking even under the most cautious conditions.

OBJECTS OF THE INVENTION

It is an object of the invention to provide novel water dilutable lacquer solutions free of monomers and having a prolonged shelf-life based on copolymers having hydroxy and carboxyl groups.

It is another object of the invention to provide a novel process for the preparation of water-dilutable lacquers in an aqueous reaction medium.

These and other objects and advantages of the invention will become obvious from the following detailed description.

THE INVENTION

The stable, water-dilutable lacquer solutions of the invention free of monomers are prepared by hydrolyzing a monomer-free copolymer having a hydroxyl number of 50 to 300 of an alkyl ester of acrylic acid and a polymerizable monomer having a hydroxyl group and if desired a polymerizable monomer not capable of being hydrolyzed or only difficultly hydrolyzable in an aqueous solution in the presence of a compound selected from the group consisting of ammonia, lower alkyl amines, morpholine and alkanolamines until the carboxyl number of the copolymer is between 60% above and below the hydroxyl number.

The starting copolymers, free of carboxyl groups, can be easily freed of unreacted monomers and solvents without undergoing any structural changes, since they contain only the hydroxyl group as a reactive group. For example, the monomers and solvents can be removed, without leaving a residue, from the copolymers free of carboxyl groups in a thin layer evaporator under vacuum and an entirely odorless product is obtained which, after hydrolysis, yields an absolutely clear aqueous solution.

Examples of suitable polymerizable monomers containing a hydroxyl group for preparing the starting copolymers are alkene alcohols of 3 to 7 carbon atoms such as allyl alcohol, methallyl alcohol, methyl-vinyl-carbinol, allyl carbinol, crotyl alcohol, isopropenyl carbinol, β-allyl-ethyl alcohol, dimethylallyl carbinol, etc. Allyl alcohol is the preferred monomer.

Examples of alkyl esters of acrylic acid used in the starting copolymers are alkyl esters of 1 to 8 carbon atoms such as methyl acrylate, ethyl acrylate, isopropyl acrylate, butyl acrylate, 2-ethylhexyl acrylate, etc. Butyl acrylate is the preferred ester.

Examples of difficultly hydrolyzable polymerizable monomers which may be used in the starting copolymer are alkyl esters of methacrylate such as methyl methacrylate, ethyl methacrylate, butyl methacrylate, 2-ethylhexyl methacrylate, octyl methacrylate, dodecyl methacrylate, octadecyl methacrylate, etc.; styrene; acrylonitrile; vinyl ethers such as isobutyl vinyl ether, unsaturated hydrocarbons such as butadiene; vinyl halides such as vinyl chloride, etc. Methacrylic acid esters are preferred.

Examples of suitable nitrogen compounds for the hydrolysis are ammonia; mono-, di- and tri-lower alkyl amines wherein the alkyls have 1 to 7 carbon atoms, such as methylamine, dimethylamine, ethylamine, diethylamine, triethylamine, propylamine, butylamine, dibutylamine, diisobutylamine, etc.; morpholine and alkanol amines such as monoethanolamine, diethanolamine, triethanolamine, etc.

The partial hydrolysis of the copolymer free of carboxyl groups, freed of monomers and solvents, can be effected by simple reflux in an aqueous solution of ammonia, lower amines or alkanolamines in a reflux condenser although temperatures between 70° and 120° C. may be used. The degree of hydrolysis can be controlled by terminating the reaction after the desired acid number has been obtained or by adding at the very beginning the amount of amine intended for the specific hydrolysis degree. Under normal storage conditions, the hydrolysis does not practically progress any further, so that no changes in the lacquer solution can result later on. In copolymers containing methacrylic acid ester groups in addition to acrylic acid ester groups, only the acrylic acid ester groups of the copolymer are hydrolyzed under the indicated hydrolysis conditions. By varying the ratio of methacrylic acid ester to acrylic acid ester in the starting copolymers, an additional possibility to control the hydrolysis degree is given. The fact that the methacrylic acid ester groups of the copolymer are not hydrolizable has a further favorable effect, in that in a simple manner, an influence is rendered possible in regard to the ratio of acrylic acid ester to methacrylic acid ester groups in water-dilutable lacquers. This is of particular significance to the film properties, since methacrylic acid ester and acrylic acid ester groups complement each other well in regard to the resistance to yellowing and to flexibility.

The preparation of the starting copolymers, free of carboxyl groups, may be effected according to U.S. Pat. No. 2,817,651. Mixtures of the polymerizable monomers, for example allyl alcohol, butyl acrylate and, if so desired, 2-ethyl-hexylmethacrylate, in the desired ratio, to which 1% di-tert.-butylperoxide was added as polymerization catalyst, were heated in the absence of oxygen at 150° C. for 1 hour in an autoclave. Then the reaction product obtained was freed of the unreacted monomers in a thin-layer evaporator under vacuum, and the copolymer could be used in this purified form in the partial hydrolysis of the invention. The ratio of the components of the starting copolymer may be 25 to 75% of polymerizable monomer containing a hydroxyl group, 5 to 75% of alkyl ester of acrylic acid and 0 to 70% of difficulty hydrolyzable or unhydrolyzable monomer.

The novel process offers, in comparison with the prior art processes, a series of valuable advantages for the production of water-dilutable lacquer solutions. According to the inventon, it is possible, by starting with a pure copolymer specifically defined by its coefficients in the composition, to obtain by controlled partial hydrolysis a product which can be predetermined in regard to its properties. An important advantage is that immediately an aqueous, usable lacquer solution is obtained from the process. The dissolving of the polymer containing hydroxyl- and carboxyl groups by means of an amine-water-mixture, which consumed much time and mechanical energy previously, is omitted. In this new process, the copolymer containing hydroxyl and carboxylic groups and easily inclined to cross-linking, is produced during the hydrolysis only in the aqueous solution, and the carboxyl groups are immediately blocked off by salt formation with the amine. As the salt formation is terminated after the hydrolysis reaction is discontinued, the lacquer solutions are essentially more stable than those which were produced by neutralization of a polymer containing in the beginning water-insoluble hydroxyl and carboxyl groups.

In comparison with those processes for the production of water dilutable lacquer solutions by means of which the carboxyl groups were obtained by partial esterification of hydroxyl groups with polybasic acids or acid anhydrides, the present process has the advantage, aside from the omission of additional reaction steps, that the conversion of the water-dilutable starting product into a water-soluble reactive lacquer binding agent can be effected in aqueous solution, thereby avoids any structural changes and prevents the separation of eventually necessary organic solvents later on.

Moreover, the present process can be started with a copolymer having a low hydroxyl number, since all of the hydroxyl groups remain available for the subsequent cross-linking. This has the advantage that for the preparation of the starting polymer according to U.S. Pat. No. 2,817,651, a small amount of allyl alcohol is used, thus substantially increasing the yield.

Furthermore, the alcohol freed during the hydrolysis, particularly butyl alcohol originating from butyl acrylate, proves to be a very welcome dissolving intermediary in the water-dilutable lacquer solution. It guarantees that during changes in concentration, no sudden increase or decrease in the viscosity occurs, and it promotes the process of film formation during the baking procedure.

In the following examples, there are described several preferred embodiments to illustrate the invention. However, it should be understood that the invention is not intended to be limited to the specific embodiments.

EXAMPLE I

In a flask provided with reflux condenser, stirrer and thermometer, 500 gm. of a copolymer prepared from 700 parts by weight of allyl alcohol and 500 parts by weight of butyl acrylate and having an OH number of 203 and a saponification number of 320, 500 gm. of water and 185 gm. of triethylamine were heated at reflux. The amount of amine used was sufficient to obtain a carboxyl number about equal to the hydroxyl number. From the originally heterogeneous mixture, a clear, aqueous solution developed after 3 hours at reflux. After another five hours at reflux, the heating bath was removed and the resulting solution was diluted with water to immersion viscosity. Phosphatized iron plates were immersed in the resulting lacquer solution to produce a coating. The coated plates were then baked for ½ hour at a temperature of 170° C. The resulting entirely transparent coatings displayed very good adhesion and a pendulum hardness (König), of 155 seconds. The flexibility of the coatings was also entirely satisfactory as a deep-drawing test according to Erichsen at 7 mm. deep-drawing displayed no damage to the coating.

EXAMPLE II 500 gm. of the copolymer of allyl alcohol and butyl acrylate used in Example I together with 500 gm. of water and 284 gm. of triethylamine were brought to reflux in a reflux condenser. The quantity of said amine was sufficient for the hydrolysis of all ester groups. At specified intervals samples were taken from the solution to show, from the films produced with these samples, the relation between film forming properties and degree of hydrolysis of the polymer.

The coatings were prepared according to Example I from the individual samples and none of them displayed any damage at an Erichsen deep-drawing of 7 mm. The relation of the film hardness to the degree of hydrolysis is shown in Table I.

TABLE I

| Duration of hydrolysis (hrs.) | 4 | 5 | 6 | 7 | 8 | 11 | 13 |
|---|---|---|---|---|---|---|---|
| Pendulum hardness according to König (secs.) | 105 | 113 | 154 | 158 | 178 | 364 | 163 |

EXAMPLE III 50 gm. of the copolymer used in Example I together with 50 gm. of water and the varying amounts of triethylamine shown in Table II were heated at reflux for 8 hours in the reflux condenser. Using the procedure of Example I, films were obtained and the hardness of the individual samples was determined. The results are shown in Table II.

TABLE II

| Amount of triethylamine in gm. | 25.4 | 22.4 | 19.4 | 16.4 | 13.4 | 10.4 | 7.4 |
|---|---|---|---|---|---|---|---|
| Relation between carboxyl and hydroxyl groups calculated from the amount of amine used (approximately) | 1.37 | 1.21 | 1.05 | 0.88 | 0.72 | 0.55 | 0.40 |
| Hardness by König (sec.) | 140 | 151 | 150 | 160 | 143 | 135 | 120 |

EXAMPLE IV

Using the procedure of Example III, 50 gm. of the copolymer of Example I and 50 gm. of water were heated with varying amounts triethanolamine at reflux for eight hours. Coatings were prepared and tested from the samples by the procedure of Example I. The results are shown in Table III.

TABLE III

| Amount of triethanolamine in gm | 42 | 38 | 34 | 30 | 26 | 22 | 18 | 14 |
|---|---|---|---|---|---|---|---|---|
| Relation between carboxyl and hydroxyl groups calculated from the amount of amine used (approximately) | 1.53 | 1.37 | 1.21 | 1.05 | 0.88 | 0.72 | 0.55 | 0.40 |
| Hardness by König (sec.) | 113 | 115 | 115 | 114 | 92 | 65 | 69 | 64 |

EXAMPLE V 100 gm. of a copolymer prepared from 525 parts by weight of allyl alcohol, 225 parts by weight of butyl acrylate and 150 parts by weight of 2-ethyl-hexyl methacrylate and having an OH number of 167 and a saponification number of 236 were heated together with 100 gm. of water and 30.0 gm. of triethylamine at reflux for 10 hours in a reflux condenser. The amount of amine used was sufficient to obtain a carboxyl number nearly equivalent to the hydroxyl number. After adjusting with water to immersion viscosity, coatings were produced from the resulting clear solution which after ½ hour baking at 180° C. gave adhesive, very elastic and transparent coatings having a pendulum hardness of 96 seconds (König).

Various modifications of the products and process of the invention may be made without departing from the spirit or scope thereof.

We claim:

1. A process for the preparation of stable, water-dilutable lacquer solutions containing copolymers with hydroxyl and carboxyl groups and free from monomers comprising hydrolyzing a monomer-free copolymer having a hydroxyl number of 50 to 300 of 5 to 75% of an alkyl ester of acrylic acid and 25 to 75% of allyl alcohol and 0 to 70% of a polymerizable monomer not capable of being hydrolyzed or only difficultly hydrolyzable in an aqueous solution in the presence of a compound selected from the group consisting of ammonia, lower alkyl amines, morpholine and alkanolamines until the carboxyl number of the copolymer is between 60% above and below the hydroxyl number.

2. The process of claim 1 wherein the alkyl ester of acrylic acid is butyl acrylate.

3. The process of claim 1 wherein the copolymer contains methacrylate esters as the difficultly hydrolyzable monomer.

4. The process of claim 1 wherein the copolymer is a copolymer of allyl alcohol and butyl acrylate.

5. The process of claim 1 wherein the copolymer is a copolymer of allyl alcohol, butyl acrylate and 2-ethylhexyl methacrylate.

6. The product produced by the process of claim 1.

7. The product produced by the process of claim 5.

References Cited

UNITED STATES PATENTS

| 2,649,439 | 8/1953 | Brown | 260—86.1 |
| 3,197,428 | 7/1965 | Siegele. | |
| 3,337,488 | 8/1967 | Lyons et al. | |

FOREIGN PATENTS

| 569,239 | 1/1959 | Belgium. |

MURRAY TILLMAN, Primary Examiner

W. J. BRIGGS, SR., Assistant Examiner

U.S. Cl. X.R.

117—132, 161; 260—80.75, 80.8, 80.81